(12) United States Patent
Hamaguchi et al.

(10) Patent No.: US 8,998,759 B2
(45) Date of Patent: Apr. 7, 2015

(54) SILENT CHAIN

(71) Applicant: Tsubakimoto Chain Co., Osaka (JP)

(72) Inventors: Shuuji Hamaguchi, Osaka (JP);
Takayuki Morimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 263 days.

(21) Appl. No.: 13/832,504

(22) Filed: Mar. 15, 2013

(65) Prior Publication Data

US 2013/0260934 A1    Oct. 3, 2013

(30) Foreign Application Priority Data

Mar. 30, 2012 (JP) .................................. 2012-079992

(51) Int. Cl.
*F16G 13/04*    (2006.01)

(52) U.S. Cl.
CPC ....................................... *F16G 13/04* (2013.01)

(58) Field of Classification Search
CPC ........................................................ F16G 13/04
USPC .................................................. 474/212, 215
See application file for complete search history.

(56) References Cited

U.S. PATENT DOCUMENTS

| 5,372,554 A | 12/1994 | Okuda |
| 5,651,746 A * | 7/1997 | Okuda ........................... 474/215 |
| 6,494,800 B1 * | 12/2002 | Kanehira et al. ............... 474/215 |

FOREIGN PATENT DOCUMENTS

JP            06207643 A    7/1994

* cited by examiner

*Primary Examiner* — William E Dondero
*Assistant Examiner* — Robert T Reese
(74) *Attorney, Agent, or Firm* — Howson & Howson LLP (57) ABSTRACT

In a silent chain, rocker joint pins are composed of first and second rocker pins having mutually engaging front rolling surfaces. Each first rocker pin is fixed to pin fixing link plates of a first link, and extends through holes in other link plates of the first link. Each first pin has a back surface engaged with portions of the pin holes in the other link plates of the first link on the inner side of a pitch line, but is spaced by a gap from portions of the same pin holes on the outer side of the pitch line. The second rocker pin moves with link plates of a second link which forms a link pair with the first link, and elastically deforms the first rocker pin when the second link is flexed relative to the first link, thereby resisting flexion of the link pair and reducing impact noise.

6 Claims, 5 Drawing Sheets

SILENT CHAIN

CROSS REFERENCE TO RELATED APPLICATION

The disclosure of Japanese Patent Application No. 2012-079992, filed on Mar. 30, 2012, and on which this application claims priority, is incorporated by reference.

FIELD OF THE INVENTION

This invention relates to a silent chain in which first and second links arranged alternately along a longitudinal direction are articulably connected by rocker joint pins, each rocker joint pin being composed of a first pin and a second pin.

The chain can be used in any of various chain transmissions such as a timing chain transmission in an automobile engine.

BACKGROUND OF THE INVENTION

In a conventional silent chain, adjacent links are connected by rocker joint pins inserted through first pin holes in a plurality of first plates composing a first link and through second pin holes in a plurality of second plates composing a second link. Examples of a chain having rocker pins are described in U.S. Pat. No. 5,372,554, granted Dec. 13, 1994 and in Japanese Patent Application No. H06-207643 published on Jul. 26, 1994.

When a silent chain travels around a set of sprockets, the adjacent links repeatedly assume a straight condition when in a free span that extends from one sprocket to another, and a flexed condition when in engagement with a sprocket.

When a pair of adjacent links moves from the straight condition to the flexed condition on approaching a sprocket, there is little resistance to flexion of the leading link relative to the immediately following link. Therefore, as the leading link engages a sprocket, impact between the leading link and the sprocket teeth due to angular momentum of the leading link generates noise.

There is a need for a silent chain in which the above-described impact noise is reduced.

SUMMARY OF THE INVENTION

In a silent chain according to the invention, rocker joint pins are composed of first and second rocker pins having mutually engaging front rolling surfaces. Each first rocker pin is fixed to pin fixing link plates of a first link, and extends through holes in other link plates of the first link. Each first pin has a back surface engaged with portions of the pin holes in the other link plates of the first link on the inner side of a pitch line, but is spaced by a gap from portions of the same pin holes on the outer side of the pitch line. The second rocker pin moves with link plates of a second link which forms a link pair with the first link, and elastically deforms the first rocker pin when the second link is flexed relative to the first link, thereby resisting flexion of the link pair and reducing impact noise.

More particularly, the silent chain, comprises a plurality of first links each comprising a plurality of first link plates, a plurality of second links each comprising a plurality of second link plates, and a plurality of rocker joint pins, each rocker joint pin connecting a first link of the chain with a second link of the chain, whereby the first links and second links are connected in alternating relationship along a longitudinal direction or the chain to form an endless chain in the form of a closed loop.

Each of the rocker joint pins includes a first pin and a second pin. Each of the rocker joint pins extends through first holes in each of a plurality of first plates composing a first link, and each of a plurality of second pin holes in each of a plurality of second plates composing a second link.

The silent chain is composed of adjacent link pairs, each comprising a first link and a second link. The adjacent link plates are movable from a straight condition to a flexed condition upon engagement with a sprocket. Each of the first and second plates is composed of parts located respectively on an inner side and an outer side of a pitch line extending through center lines of the first and second holes. The inner and outer sides are respectively on the side of the pitch line toward the inside of the loop formed by the chain and on the side of the pitch line toward the outside of the loop.

The first pins and the second pins of each rocker pin extend through pin holes in the link plates of the first and second links of an adjacent link pair. The first plates of each first link include pin fixing plates to which the first pins of the rocker joint pins are fixed against rotation relative to the pin-fixing plates, and additional plates other than the pin-fixing plates. The first and second pins of each of the rocker joint pins are in contact with each other at a contact site. The pin holes in the additional plates have counter surfaces that face a first pin extending through the pin holes in the additional plates. When the first and second links of each adjacent link pair are in a straight condition, a gap having a first width exists between the first pin extending through holes in said first and second links and the counter surface of the additional plates of the first link. The gap is provided by a gap forming portion at least on one of the first pin and the counter surfaces of pin holes in the additional plates.

When the adjacent link pair is in a maximum flexed condition, the second pin in contact with the first pin at the contact site elastically deform the first pin, thereby causing the width of the gap to be smaller than the first width.

When the adjacent link pair starts to engage the sprocket teeth, and proceeds from its straight condition to its flexed condition, flexion resistance is generated when the first pin or a pin fixing plate is elastically deformed, reducing the gap between the first pin and the counter surfaces of the plates other than the pin fixing plates.

The angular momentum of the second link is decreased, and the impact noise caused when the second link collides with the sprocket decreases.

When the first pin comes into contact with the counter surface at the gap forming portion in the maximum flexed condition, no further elastic deformation of the first pin or the pin fixing plate takes place. Accordingly, it is possible to prevent excessive elastic deformation, and to improve the durability of the first pin or of the pin fixing plate, and the overall durability of the silent chain.

According to a second aspect of the invention, each of the first pins is in contact with a supporting surface of the pin fixing plate on both the inner and outer sides of the pitch line, and is in contact with the counter surface only on the inner side of the pitch line. At least a part of the gap is on the outer side of the pitch line in each adjacent link pair when the adjacent link pair is in its straight condition, and is in contact with the counter surface on the inner side and in contact with the counter surface at the gap forming portion on the outer side of the pitch line when the adjacent link pair is in its maximum flexed condition.

With this arrangement, the first pin is prevented from rolling by the pin fixing plate, and is supported by the other plates on the inner side of the pitch line both in the straight and maximum flexed conditions of the adjacent link pair.

In a third aspect of the invention, the contact site of the rocker pins in each adjacent link pair is located only on the inner side of the pitch line when the adjacent link pair is in its straight condition, and only on the outer side of the pitch line when the adjacent link pair is in its maximum flexed condition. Because the contact site is located on the inner side in the straight condition, it is possible to prevent the first pin or the pin fixing plates from becoming elastically deformed except by pressure from the second pin at the contact site. Accordingly, it is possible to improve the durability of the first pin and the overall durability of the silent chain as a whole. Further, because the contact site is located on the outer side of the pitch line when the adjacent link pair approaches its maximum flexed condition, it is possible to cause elastic deformation of the first pin reliably without excessive load on the second pin that presses the first pin at the contact site.

According to a fourth aspect of the invention, the counter surface has an inner contact portion and a gap-forming portion. The gap forming portion has an outer contact portion located outward from the inner contact portion in the direction proceeding from the inner side of the pitch line toward the outer side of the pitch line. The inner contact portion is in contact with the first pin both when the adjacent link pair is in its straight condition and when the adjacent link plate pair is in its maximum flexed condition. The outer contact portion is spaced from the first pin when adjacent link plate pair is in its straight condition and in contact with the first pin when the adjacent link plate pair is in it maximum flexed condition.

Here, the gap-forming portion is provided not on the first pin but on the counter surface, i.e., on the inner wall of the pin hole. This makes it possible to ensure adequate rigidity and durability of the first rocker pin. Furthermore, because the inner contact portion is in contact with the first rocker pin together with the holding surfaces of the pin fixing plate, the load acting on the first pin is dispersed, the load applied to the pin fixing plate is reduced, and the durability of the pin fixing plate can be improved, further improving the overall durability of the silent chain.

DETAILED DESCRIPTION OF THE PREFERRED EMBODIMENTS

Figure 1:
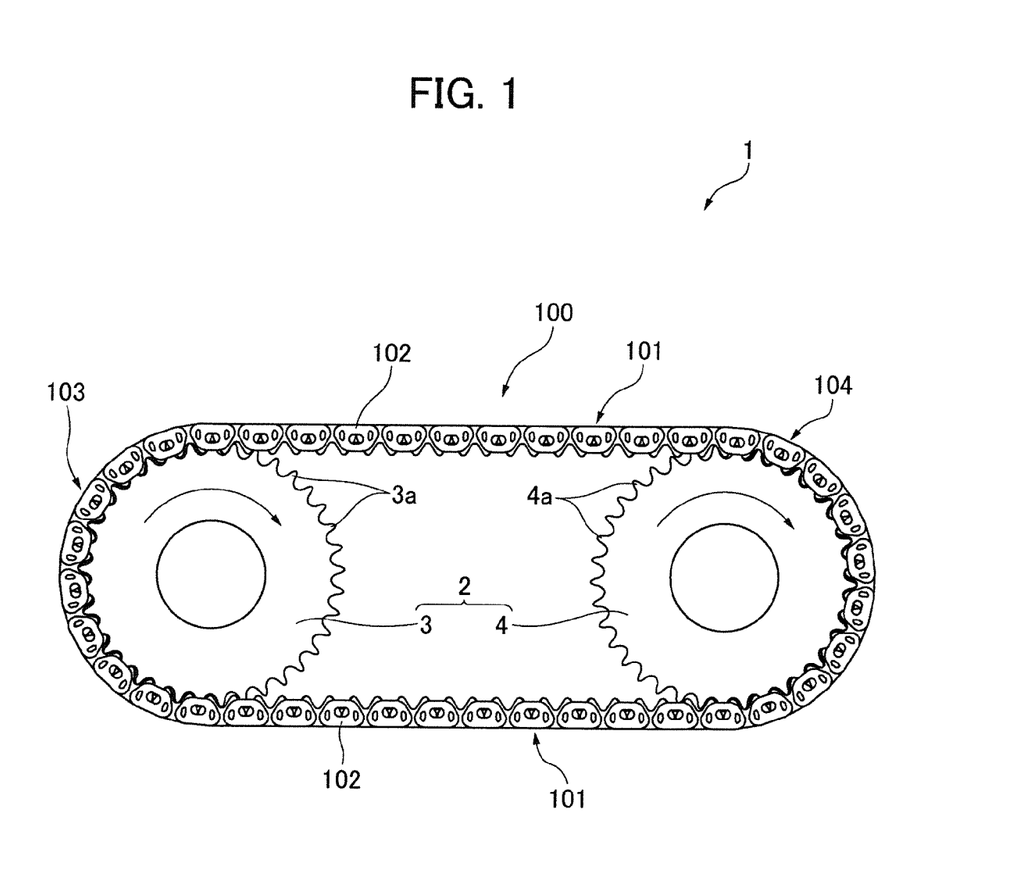
FIG. 1 is a schematic diagram of a chain transmission including a silent chain in accordance with the invention.

Silent chain 100 in FIG. 1 is an endless chain in a chain transmission 1 of the kind used to transmit power in an automobile engine for example. The chain transmission 1 includes a set 2 of sprockets in meshing engagement with the chain.

The set of sprockets includes a driving sprocket 3 and a driven sprocket 4. In some embodiments, there can be more than on driven sprocket, more than one driving sprocket, or more than one of each kind of sprocket. The sprockets 3 and 4 have sprocket teeth 3a and 4a for engagement with teeth formed by toothed link plates of the chain 100.

Figure 2:
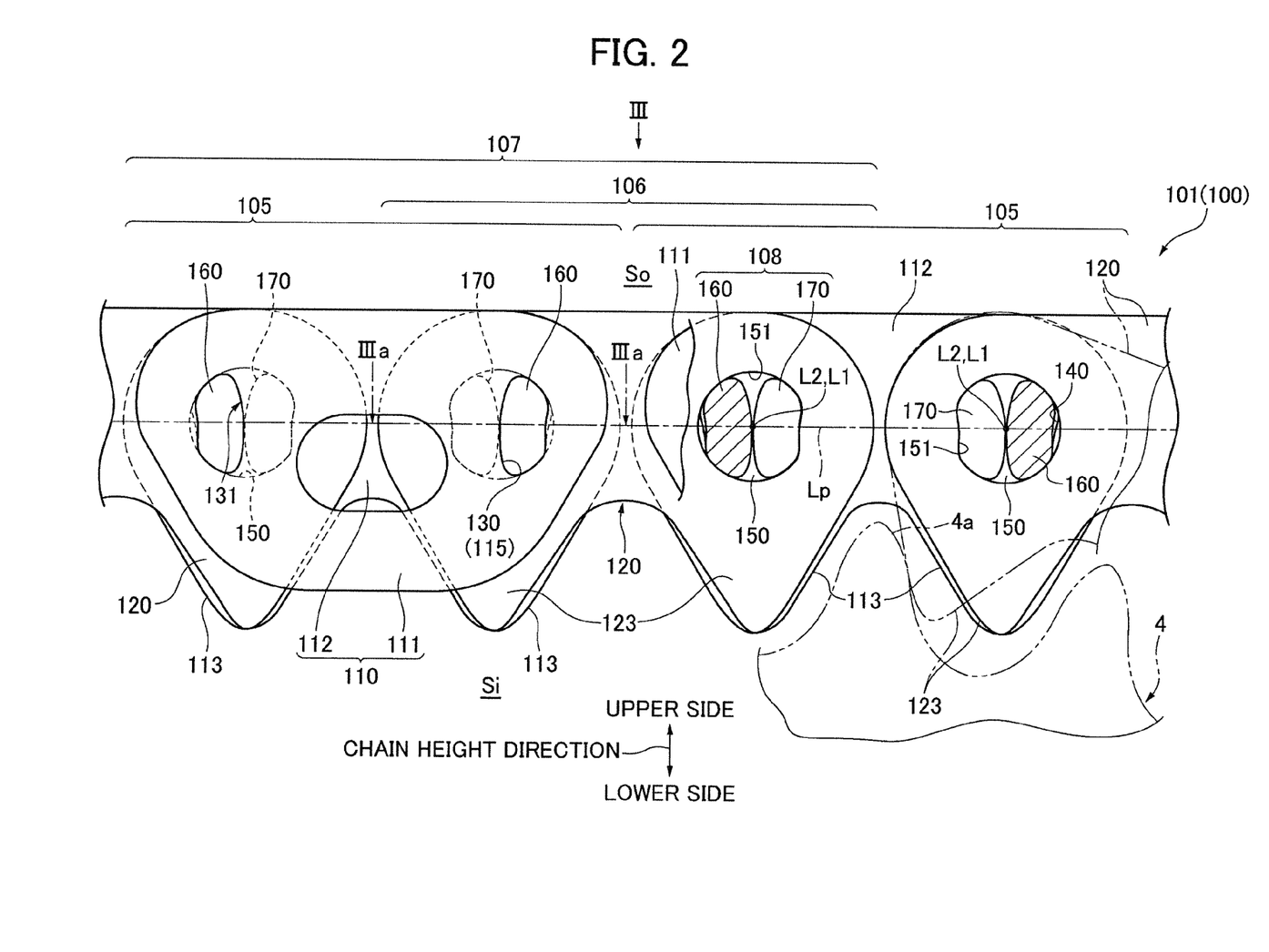
FIG. 2 is an enlarged sectional view of a part of the chain transmission shown in FIG. 1, taken on section plane II-II in FIG. 3.

In the transmission, the chain travels in a direction such that the sprockets 3 and 4 rotate in the directions indicated by the arrows in FIG. 1. The chain includes free-span portions 101 not engaged with the sprockets 3 and 4. A part of a free span portion of the chain is also shown in FIG. 2. The chain also includes portions 103 and 104, which are wrapped around the respective sprockets 3 and 4.

Figure 3:
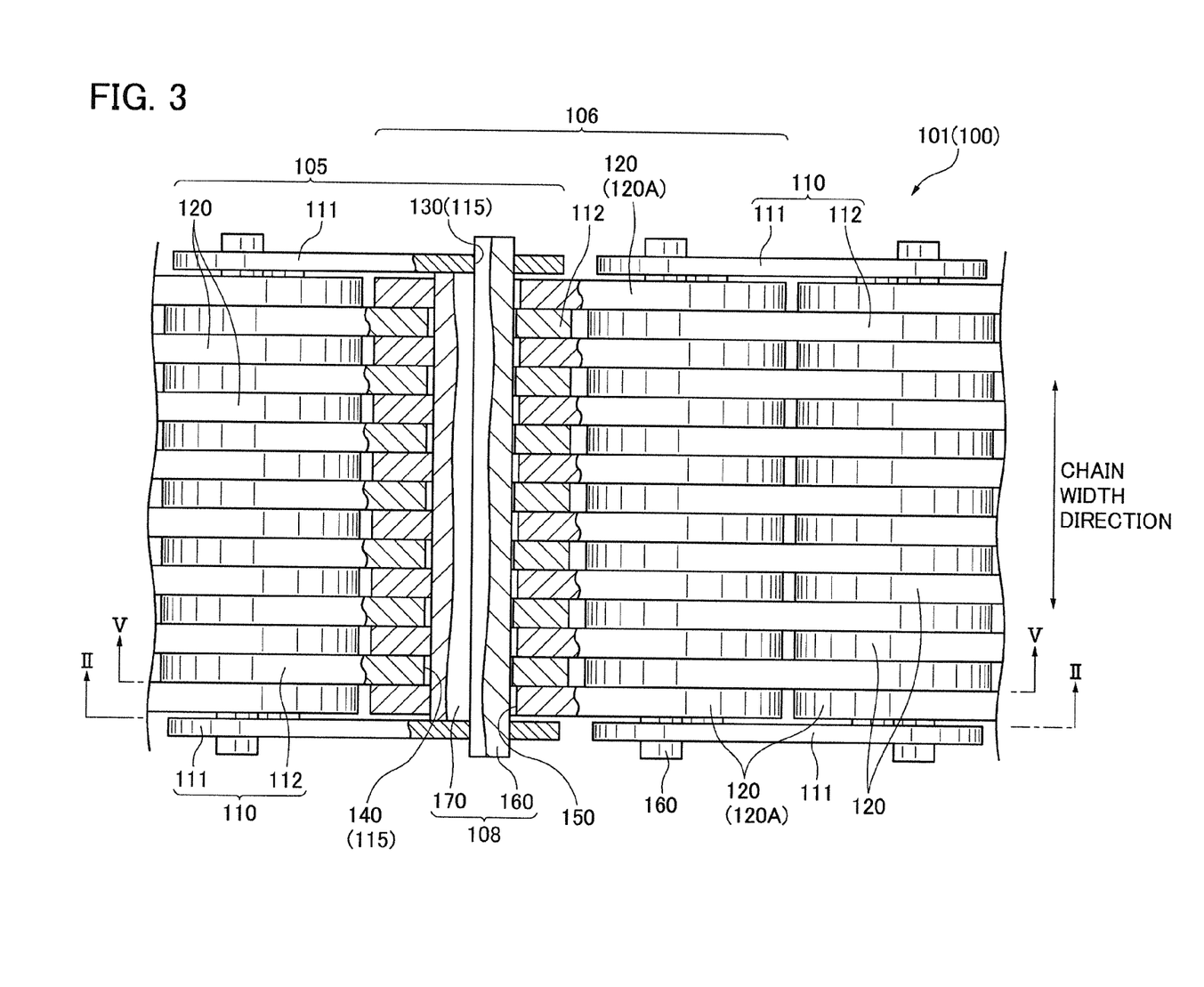
FIG. 3 is top plan view, partly in section, of a part of the chain as viewed along the direction of arrow III in FIG. 2.

As shown in FIGS. 2 and 3, the chain includes a plurality of guide rows 105, which constitute a set of first links in the chain, a plurality of non-guide rows 106, which constitute a set of second links in the chain, and a plurality of rocker joint pins 108, connecting the guide rows 105 and the non-guide row 106 in alternating sequence along the longitudinal direction of the chain, i.e., the direction of travel of the chain.

Each of the guide rows 105 is composed of a plurality of first link plates 110 disposed in spaced relationship with one another in the widthwise direction of the chain.

Each of the first link plates 110 has a pair of first pin holes 115 separated from each other in the longitudinal direction of the chain.

The first link plates 110 composing the guide row 105 include a pair of guide plates ill, which are spaced from each other and opposed to each other in the widthwise direction of the chain. The first link plates 110 also include a plurality of inner plates 112 disposed between the guide plates 111. These inner plates 112 are spaced from one another in the widthwise direction of the chain so that they can be interleaved with link plates of non-guide rows.

As shown in FIG. 2, each of the inner link plates 112 is provided with a pair of teeth 113 engageable with the sprocket teeth 3a and 4a (FIG. 1).

Each of the non-guide rows 106 is composed of a plurality of second link plates 120 similarly spaced from one another in the widthwise direction of the chain so that they can be interleaved with link plates of the guide rows.

Each of the second link plates 120 similarly has a pair of second pin holes 150 spaced from each other in the longitudinal direction, and a pair of teeth 123 engageable with sprocket teeth 3a and 4a.

In each non-guide row 106, the second link plates 120 are interleaved with the plates 111 of a preceding guide row 105 and with the plates of a following guide row.

A guide row 105 and a non-guide row 106 having interleaved plates are referred to as "adjacent links 107" or as an "adjacent link pair." The links of each such pair are connected articulably by rocker joint pins 108 that extend through first and second pin holes 115 and 150.

Each rocker joint pin 108 is composed of a first rocker pin 160 and a second rocker pin 170, pin 170 being shorter than pin 160. Each rocker joint pin 108 is inserted through a set of first and second pin holes 115 and 150 of interleaved sets of plates, the pin holes being aligned with one another in the widthwise direction of the chain.

Figure 4:
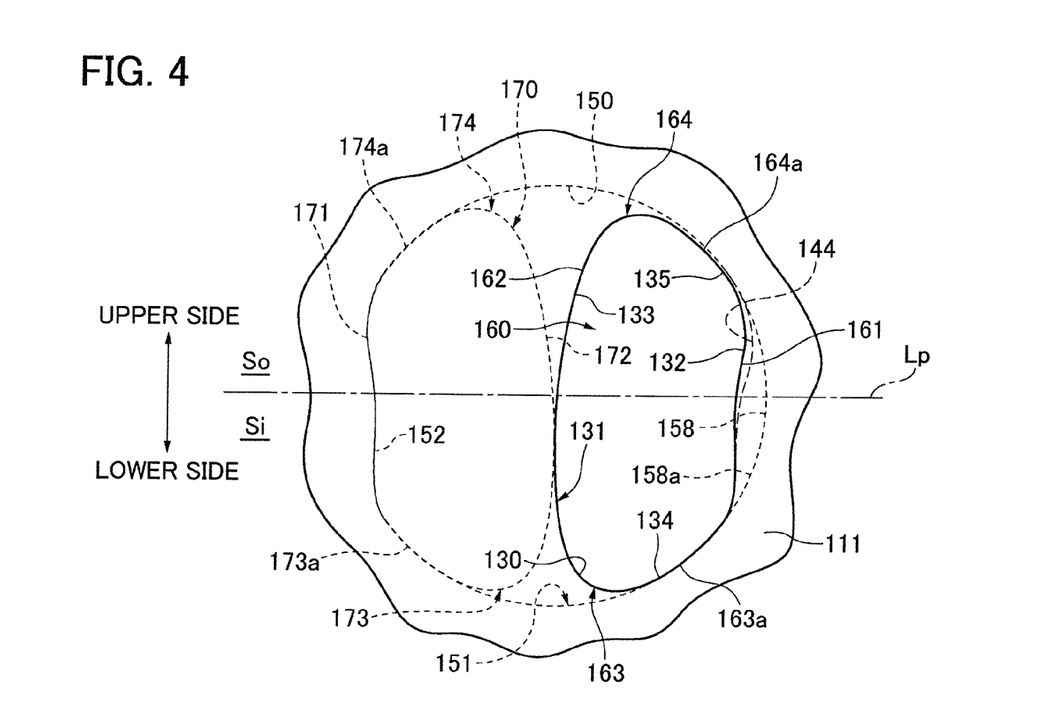
FIG. 4 is an enlarged side elevational view of a part of the chain shown in FIGS. 2 and 3, wherein two adjacent links are in a straight condition.

Each first rocker pin 160 is retained in holes 130 in guide plates 111 at both of its ends by a by a suitable means such as caulking or by the use of retaining pins. As shown in FIG. 4, each of the rocker pins is fixed to the wall of a guide hole 130 so that it cannot rotate relative to the guide plate 111.

As shown in FIG. 2, the first rocker pin 160 extends through pin holes 140 in the inner plates of the guide links, through the pin holes 150 in the plates of the non-guide links, and into holes 130 in the guide plates. The second rocker pin 170 extends through pin holes 140 and pin holes 150, but does not extend into guide plate holes 130.

The cross-sectional shape of each of the rocker pins 160 and 170, taken on a plane orthogonal to the widthwise direction of the chain, is uniform along the length of the pin provided that the pin is not elastically deformed.

As shown in FIG. 2, the guide plates 111, the inner plates 112 and the second link plates 120 have a flexion inner side Si and a flexion outer side So on opposite sides of a straight longitudinal center pitch line Lp extending through the centers of the pin holes.

The pitch line Lp extends through first pin hole center lines L1 of pin holes 140 in the inner plates 112 of the guide row 105 and through second pin hole center lines L2 of pin holes 150 in the link plates 120 in the non-guide rows 106.

Each pair of guide pin holes 130 in a guide plate 111, each pair of pin holes 140 of an inner link plate 112, and each pair of pin holes 150 of the link plate 120 is symmetrical about a plane orthogonal to the pitch line Lp and parallel to the chain width direction.

As shown in FIGS. 1 and 2, in a straight portion 102 in a free-span 101 of the chain, the guide rows 105 and the adjacent non-guide rows 106 are connected in a straight condition. As the chain 100 travels, each adjacent link pair 107 moves from a straight condition in the free-span 101 to a flexed condition in which the adjacent link pair 107 flexes as the chain begins to bend upon engagement with one of sprockets 3 and 4. FIG. 2 shows, in broken lines, a second link plate 120 engaging the driven sprocket 4, move from its straight condition to a flexed condition. Conversely, upon disengagement from a sprocket, the link plate moves from its flexed condition to a straight condition.

The angle through which the link plates 120 bend increases gradually as the adjacent link pair 107 comes into engagement with a sprocket until it reaches a maximum angle. In FIG. 2 the link pair of which the plate 120 shown in broken lines is a part is approaching its maximum flexed condition.

After traveling around a sprocket in its maximum flex condition the adjacent link pair 107 returns from its maximum flexed condition to a straight condition upon disengagement from the sprockets.

Figure 5:
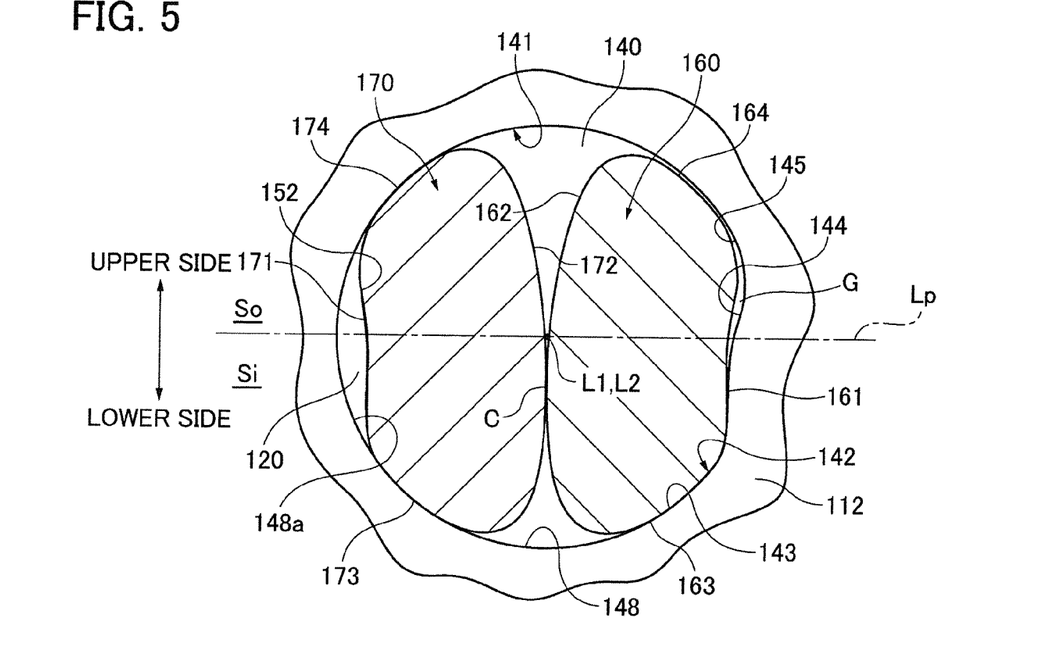
FIG. 5 is an enlarged side elevational view of a part of the chain of FIGS. 2 and 3, as viewed along the direction of arrows a V-V in FIG. 3, wherein the adjacent links are in a straight condition.
Figure 6:
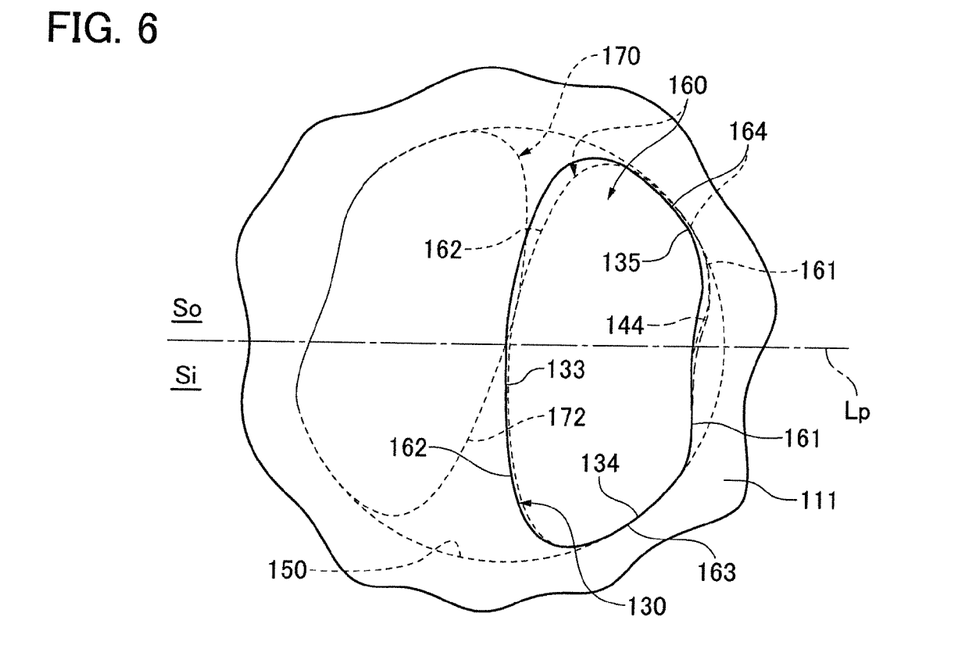
FIG. 6 is an enlarged view, corresponding to FIG. 4, but showing the two adjacent links in a flexed condition.

As shown in FIGS. 2, 4 and 5, and particularly in FIG. 4, each of the first rocker pins 160 has a uniform cross-sectional shape in the chain width direction with concave back surface 161, a convex, smooth, arc-shaped first rolling surface 162, and a pair of first connecting surfaces 163 and 164, respectively having arc-shaped portions 163a and 164a, the connecting surfaces being smoothly continuous with the first back surface 161 and with the first rolling surface 162.

Similarly, each of the second rocker pins 170 has a concave second back surface 171, a convex, smooth, arc-shaped second rolling surface 172, and a pair of second connecting surfaces 173 and 174, respectively having arc-shaped portions 173a and 174a the connecting surfaces being smoothly continuous with the second back surface 171 and the second rolling surface 172.

The first connecting surface 163 is a first inner connecting surface located on the flexion inner side Si of the pitch line Lp and the first connecting surface 164 is a first outer connecting surface 164 located on the flexion outer side So. Similarly, the second connecting surface 173 is a second inner connecting surface located on the flexion inner side Si, and the second connecting surface 174 is a second outer connecting surface located on the flexion outer side So.

The arc-shaped portions 163a, 164a, 173a and 174a of the connecting surfaces have a center of curvature substantially on the pin hole center lines L1 and L2, which substantially coincide.

When a term herein is modified by the word "substantially" the term so modified is intended to encompass range of variation in which there is no significant difference in terms of operation and effect from the term as strictly construed.

Figure 7:
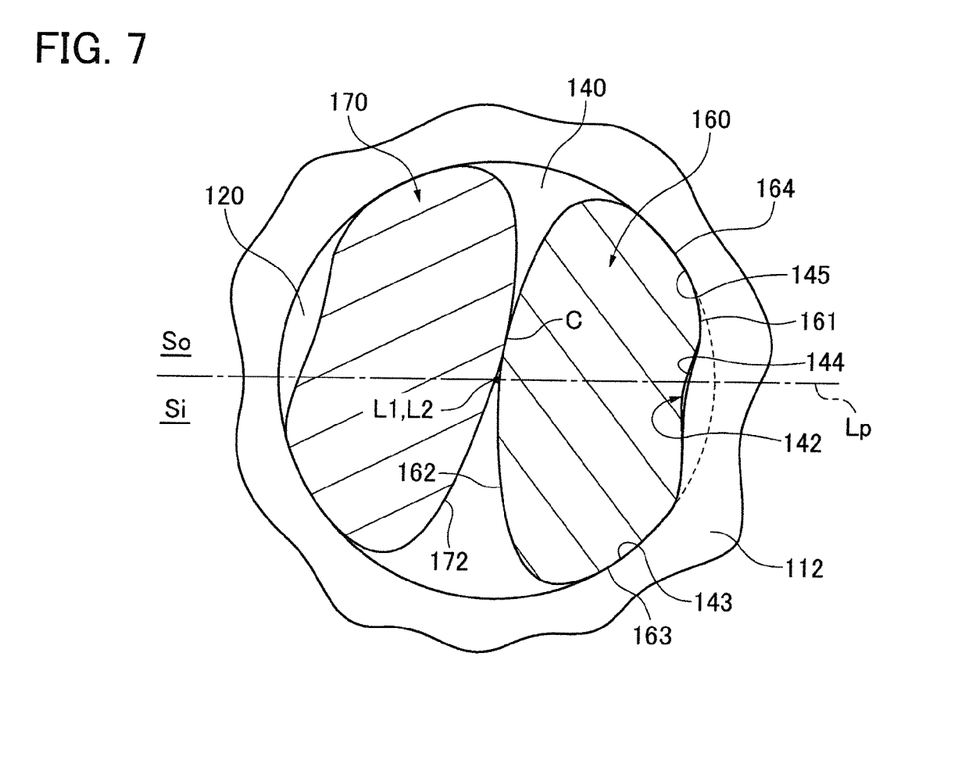
FIG. 7 is an enlarged view, corresponding to FIG. 5, but showing the condition of the rocker pins when two adjacent links are in a flexed condition.

The first and second rolling surfaces 162 and 172 are in contact with each other at a contact site C (FIG. 5). When the adjacent link pair 107 moves into its flexed condition, the first rocker pin 160 and the second rocker pin 170 move with the inner plates 112 and the second link plates 120, and their rolling surfaces 162 and 172 roll on each other. When the adjacent link pair is in its straight condition, the contact site C is located on the flexion inner side Si as shown in FIG. 5. As the adjacent link pair engages a sprocket, the angle of flexion increases and the contact site C toward and through the pitch line Lp toward the flexion outer side So. The contact site C is located on the flexion outer side So when the adjacent link pair is in its maximum flexed condition as shown in FIG. 7.

As shown in FIG. 4, the pin hole 130 in a guide plate 111 has a pin supporting surface 131 which includes a back face supporting surface 132, a rolling face supporting surface 133 and a pair of connecting surface supporting surfaces 134 and 135, which respectively contact and support the first back surface 161, the first rolling surface 162 and the pair of first connecting surfaces 163 and 164 of the pin 160. These supporting surfaces 132, 133, 134 and 135 hold the first rocker pin 160 in a so that it cannot roll within the guide pin hole 130 when the adjacent link pair 107 moves between its straight condition and its flexed condition.

As shown in FIGS. 4 and 5, wall surface 141 of pin hole 140 of the inner link plate 112 includes a counter surface 142 facing to the first back surface 161 and the respective first connecting surfaces 163 and 164 of the first rocker pin 160, and a first supporting surface 148 having an arc-shaped portion 148a which is smoothly continuous with the counter surface 142.

The first supporting surface 148 supports the second rocker pin 170 in such a way that the second rocker pin can roll within pin hole 140 while supporting surface 148 is in contact with second connecting surfaces 173 and 174 of the second rocker pin 170. The arc-shaped part 148a of first supporting surface 148 is centered on he coinciding center lines L1 and L2.

As shown in FIG. 4, the counter surface 142 extends continuously from the flexion inner side Si to the flexion outer side So, and has both an inner contact portion 143 located on the flexion inner side Si, and a gap-forming portion 144 located radially outside relative to the back face supporting surface 132 of pin hole 130 in guide plate 111 and the outer connecting surface supporting surface 135. Thus, while the inner contact portion 143 of pin hole 140 is in contact with the pin 160 on the flexion inner side Si, a gap G is formed between the pin 160 and an outer contact portion 145 in a corresponding position on the flexion outer side The inner contact portion 143 is directly aligned in the widthwise direction of the chain with the back face supporting surfaces 132 and the inner connecting surface supporting surfaces 134 of the pin holes in the guide plates. The inner contact portion 143 is also located on the inner side Si of pitch line Lp. When the chain is in its straight condition and also when the chain is in its flexed condition, including its maximum flexed condition, the inner contact portion 143 is in surface contact with the first back surface 161 and the first inner connecting surface 163 of the first rocker pin 160, and supports pin 160 so that rolling of the pin 160 is prevented. Therefore, as shown in FIGS. 5 and 7, the part of pin 160 that contacts the walls 141 of pin holes 140 on the inner side of the pitch line Lp remains in the same position relative to inner link plates 112 of the guide row while the second link plates of the adjacent non-guide row flex relative to the guide row.

As shown in FIGS. 4 and 5, the gap-forming portion 144 is located radially outside relative to the back face supporting surfaces 132 and the outer connecting supporting surfaces of the guide plate pin holes. The gap forming portion 144 extends continuously from the inner side Si to the outer side So, and includes an outer contact portion 145. As shown in FIG. 7, the outer contact portion 145 comes into surface contact with at least a part of the first back surface 161 and the first outer connecting surface 164 of pin 160 at least when the non-guide link is in its maximum flexed condition relative to the adjacent guide row.

The gap G is exaggerated in FIG. 5 for the purpose of illustration. As the adjacent link pair 107 moves from its straight condition toward its maximum flexed condition. The width of the gap G gradually decreases.

As shown in FIG. 4, the wall surface 151 of pin hole 150 in the second link plate 120 has a contact surface 152 that supports the back surface 171 of the second rocker pin 170, and a second supporting surface 158 having an arc-shaped portion 158a that is smoothly continuous with contact surface 152. Parts 174a and 173a of connecting surfaces 173 and 174 of the second rocker pin 170 are in surface contact with the arc-shaped portion 158a.

Both the contact surface 152 and the second supporting surface 158 extend across the pitch line Lp from the inner side Si to the outer side So.

The second supporting surface 158 is in contact with connecting surfaces 163 and 164 of the rocker pin 160, and allows pin 160 to roll within pin hole 150.

The behavior of the adjacent link pair 107 comprising a guide row 105 and a preceding adjacent non-guide row 106, and the behavior of the first and second rocker pins 160 and 170 by which the rows of the link pair 107 are connected, when the non-guide row 106 flexes relative to the guide row 105, will be explained with reference to FIGS. 4 through 7 and FIG. 2.

As shown in FIGS. 2 and 4, as the silent chain 100 travels with the adjacent link pair 107 in a straight condition, the first rocker pin 160 is held by the guide plates 111 so that the back surface 161 and the rolling surface 162, which continue across the pitch line Lp in surface contact respectively with the back face supporting surfaces 132 and the rolling face supporting surfaces 133 of the pin holes in the guide plates. The inner connecting surface 163 is also in surface contact with surface 134 on the inner side Si, and the outer connecting surface 164 is in surface contact with the surface 135 on the outer side So.

As shown also in FIG. 5, the first rocker pin 160 is in contact in the inner link plate 112 such that back surface 161 is in surface contact with the inner contact portion 143 of the counter surface 142 on the inner side Si. However, a gap G exists between the outer connecting surface 164 and the outer contact portion 145. This gap extends across the pitch line Lp from the inner side Si to the outer side So.

Therefore, the first rocker pin 160 is in contact with the wall of the guide pin hole over substantially its entire perimeter, and, when the adjacent link pair is straight, the first rocker pin 160 is in contact with the inner link plates 112 only by contact, on the inner side Si of the pitch line Lp, between the back surface 161 and the inner connecting surfaces 163 respectively with the inner contact portions 143 and the counter surfaces 142 of the pin holes in link plates 112. On the outer side So, a gap G is created at the gap forming portion 144.

While the adjacent link pair is in its straight condition, the contact site C at which the first and second rocker pins 160 and 170 contact each other is located on the inner side Si of the pitch line Lp.

When the adjacent link pair 107 flexes to its maximum flexed condition, as indicated by the broken line in FIG. 2, the first rocker pin 160 remains in contact with the walls of the guide plate pin holes around substantially its entire perimeter. As shown in FIG. 7, the back surface 161 of pin 160 and its first inner connecting surface 163 are both in surface contact with the inner contact portion 143 on the inner side Si as in FIG. 5 where the adjacent link pair is in its straight condition. However, as the adjacent link pair approaches its maximum flexed condition, the width of gap G between the gap forming portion 144 and both the back surface 161 and the outer connecting surface 164 decreases. In the embodiment shown, when the maximum flexed condition is reached, at least one of the back surface 161 and the outer connecting surface 164, or both surfaces 161 and 164, are in surface contact with the outer contact portion 145 of the wall of pin hole 140. Thus, connecting surfaces 163 and 164 of pin 160 are in contact respectively with the inner contact portion 143 and the outer contact portion 145 of the counter surface 142 on the inner and outer sides Si and So. Portions of surface 161 are also in contact with the inner and outer contact portions 143 and 145. When the adjacent link pair is in its maximum flexed condition, the contact site C is located on the outer side So of the pitch line Lp.

The decrease of the width of gap G, and the contact between of surfaces 161 and 164 with the outer contact portion 145 are caused by rolling of the second rocker pin 170 on the first rolling surface 162 of rocker pin 160. The rolling action of pin 170 on pin 160 presses pin 160 at the contact site C, which is located on the outer side So of the pitch line causing elastic deformation of pin 160. The elastic deformation of pin 160, in turn, presents resistance to flexion. The elastic deformation of pin 160 is exaggerated in FIGS. 6 and 7 for the purpose of illustration.

The elastic deformation of pin 160, caused by flexing of a non-guide row relative to a guide row, ends when pin 160 comes into contact with portion 145. This contact can occur before the maximum flex condition is reached. If pin 170 continues to rolls on the surface 162 of pin 160, it does so without causing further elastic deformation of pin 160.

As indicated above, in the operation of the chain transmission, adjacent link pairs repeatedly flex and return to their straight condition. When an adjacent link pair 107 starts to engage sprocket teeth, the guide row 105 and the non-guide row 106 flex relative to each other from their straight condition while in a free span of the chain. While this flexing takes place, since the pin 160 is prevented from rolling because its ends are fixed in pin holes in a pair of guide plates, it undergoes elastic deformation as pin 170 rolls on pin 180 and the contact site C moves from the inside to the outside of the pitch line. Elastic deformation of the rocker pin 160 resists flexion of the adjacent link pair, reducing the angular momentum of the non-guide row and thereby reducing impact caused when the teeth of the non-guide row collide with the sprocket teeth. The result is a reduction in impact noise generated by the chain.

The size of the gap G limits the amount of deformation that the rocker pin 160 can undergo as the adjacent link pair proceeds toward its maximum flexed condition. Accordingly, excessive elastic deformation of the pin 160 can be prevented and its durability can be improved.

The first rocker pin 160 is in contact with supporting surfaces of the pin holes in the guide plates 111 on both the inner and outer sides Si and So of the pitch line Lp. However, it is in contact with the counter surface 142 of the inner link plate 112 only on the inner side Si while a gap G is formed at the gap forming portion 144 on the outer side So while the adjacent link pair joined by the rocker joint pin composed of pins 160 and 170 is in its straight condition. Pin 160 is in contact both with surface 142 on the inner side Si and with outer contact portion 145 of the gap forming portion 144 on outer side So when the adjacent link pair is in its maximum flexed condition.

The contact site C where rocker pins 160 and 170 contact each other is located only on the inner side Si when the adjacent link pair is in its straight condition, and only on the outer side So when the adjacent link pair is in its maximum flexed condition. Because the contact site C is located on the inner side Si when the adjacent link pair is in its straight condition, it is possible to prevent the first rocker pin 160 from undergoing elastic deformation when the adjacent link pair is straight. Accordingly, it is possible to improve the durability of the rocker pin 160, and the overall durability of the silent chain. Furthermore, because the contact site C is located on the outer side So of the pitch line Lp when the adjacent link pair is in its maximum flexed condition, it is possible to obtain elastic deformation of pin 160 reliably while reducing the load on the pin 170 that presses against pin 160 through the contact site C.

Whether the adjacent link pair is straight or flexed, the inner contact portion 143 of the counter surface 142 is spaced radially from the pin hole center line L1 by the same distance by which the corresponding holding surfaces of the pin holes of the guide plates are spaced from the center line L1. The outer contact portion 145 is located at a greater radial distance from the center line L1 and radially outside relative of the back face supporting surfaces 132 and the inner connecting surface supporting surfaces 134 of the guide plate pin holes, thereby create gap G when the adjacent link pair is in its straight condition, but contacts pin 160 when the adjacent link pair is in its maximum flexed condition. The gap forming portion 144 is thus provided not on the rocker pin 160 but on the counter surface 142, thereby ensuring assure rigidity and improved durability of the rocker pin 160.

The inner contact portion 143 and other supporting surfaces in the link plate 112 are in contact with the first rocker pin 160 over an area such that the load acting on pin 160 is dispersed. The load applied to the guide plates 111 is accordingly reduced, and the durability of the guide plates is improved, further improving the overall durability of the silent chain.

Various modifications can be made to the embodiment described above. For example, instead of relying upon elastic deformation of the rocker pin 160, flexion resistance may be based on elastic deformation of the guide plates 111 in the vicinity of their pin hole wall surface 131. As a further alternative, flexion resistance may be based on a combination of elastic deformation of the rocker pin 160 and of the guide plates 111. The same advantageous effects achieved by the embodiment described above can be achieved in these modifications.

A small gap width may be maintained at gap G even when the adjacent link pair is in its maximum flexed condition, in which case the rocker pin 160 never contacts the gap forming portion 144. That is the rocker pin 160 never contacts portion 145 of the gap forming portion 144.

In another modification, the surfaces for holding the first pin in the guide plates so that the pin does not roll may be composed of parts of the pin hole wall surfaces rather than the entire perimeter of the pin hole wall surfaces.

Although in the embodiment described above, the gap forming portion 144 is a part of the counter surface 142 of an inner guide row link plate, and this arrangement affords the advantage of improved pin durability, in an alternative embodiment, the gap forming portion can be provided by modifying the shape of the first rocker pin. Specifically, the gap forming portion may be provided on the pin 160 by forming the portion that engages the guide plate pin holes so that the radial distance from center line L1 to the outer connecting surface 164 is smaller than the corresponding radial distance in the embodiment shown in FIG. 5. In this case, the gap G may be created between the rocker pin 160 and the gap forming portion 144 of the counter surface 142, or when no gap forming portion is provided on the counter surface 142, between the gap forming portion of the rocker pin 160 and a counter surface 142 having a radial distance from center line L1 equal to the radial distance from the center line L1 to the back face supporting surfaces 132 and the outer connecting surfaces 135 in the guide plate pin holes.

In still another modification, the first pin may be the second rocker pin 170, the second pin may be the first rocker pin 160, the first plate may be the second link plate 120, the second plate may be the first link plate 110, and, instead of using guide plates, the longer pins of the rocker joint pins can be fitted to outside link plates, such as plates 120A in FIG. 3.

The last-mentioned modification may also be combined with the embodiment described in detail above. In this case, gaps corresponding to gap G may be created between the first rocker pins 160 and the pin hole wall surfaces 141 and also between the second rocker pins 170 and the second pin hole wall surfaces.

The plates to which the pins are fixed may also be plates other than the guide plates and other than outside link plates.

What is claimed is:
1. A silent chain, comprising:
a plurality of first links each comprising a plurality of first link plates;
a plurality of second links each comprising a plurality of second link plates; and
a plurality of rocker joint pins, each rocker joint pin connecting a first link of the chain with a second link of the chain, whereby the first links and second links are connected in alternating relationship along a longitudinal direction of the chain to form an endless chain in the form of a closed loop;
in which each of said rocker joint pins includes a first pin and a second pin;
in which each of said rocker joint pins extends through first holes in each of a plurality of first plates composing a first link, and each of a plurality of second pin holes in each of a plurality of second plates composing a second link;
in which the silent chain is composed of adjacent link pairs, each comprising a first link and a second link, said adjacent link plates being movable from a straight condition to a flexed condition upon engagement with a sprocket;
in which each of the first and second plates is composed of parts located respectively on an inner side and an outer side of a pitch line extending through center lines of the first and second holes, said inner and outer sides being respectively on the side of the pitch line toward the inside of said loop and on the side of the pitch line toward the outside of said loop;

in which the first pins and the second pins of each rocker pin extend through pin holes in the link plates of the first and second links of an adjacent link pair;

in which the first plates of each first link include pin fixing plates to which the first pins of the rocker joint pins are fixed against rotation relative to said pin fixing plates, and additional plates other than said pin-fixing plates;

in which the first and second pins of each of said rocker joint pins are in contact with each other at a contact site;

in which the pin holes in said additional plates have counter surfaces that face a first pin extending through said pin holes in said additional plates;

in which when the first and second links of each said adjacent link pair are in a straight condition, a gap having a first width exists between the first pin extending through holes in said first and second links and the counter surface of said additional plates of the first link, said gap being provided by a gap forming portion at least on one of the first pin and the counter surfaces of pin holes in said additional plates; and in which, when the adjacent link pair is in a maximum flexed condition, the second pin in contact with said first pin at said contact site elastically deform said first pin thereby causing the width of said gap to be smaller than said first width.

2. The silent chain according to claim 1, wherein each of said first pins is in contact with a supporting surface of the pin fixing plate on both inner and outer sides of said pitch line and is in contact with the counter surface only on the inner side of said pitch line, and wherein at least a part of said gap is on the outer side of said pitch line in each said adjacent link pair when the adjacent link pair is in its straight condition, and is in contact with the counter surface on the inner side and is in contact with the counter surface at the gap forming portion on the outer side of said pitch line when the adjacent link pair is in its maximum flexed condition.

3. The silent chain according to claim 2, wherein the contact site of the rocker pins in each adjacent link pair is located only on the inner side of the pitch line when the adjacent link pair is in its straight condition, and only on the outer side of said pitch line when the adjacent link pair is in its maximum flexed condition.

4. The silent chain according to claim 3, wherein the counter surface has an inner contact portion and a gap forming portion; the gap forming portion has an outer contact portion located outward from the inner contact portion in a direction proceeding from the inner side of the pitch line toward the outer side of the pitch line; the inner contact portion is in contact with the first pin both when the adjacent link pair is in its straight condition and when the adjacent link pair is in its maximum flexed conditions; and the outer contact portion spaced from the first pin by said gap when the adjacent link pair is in its straight condition and is in contact with the first pin when the adjacent link pair is in its maximum flexed condition.

5. The silent chain according to claim 2, wherein the counter surface has an inner contact portion and a gap forming portion; the gap forming portion has an outer contact portion located outward from the inner contact portion in the direction proceeding from the inner side of the pitch line toward the outer side of the pitch line; the inner contact portion is in contact with the first pin both when the adjacent link pair is in its straight condition and when the adjacent link plate pair is in its maximum flexed condition; and the outer contact portion is spaced from the first pin when adjacent link plate pair is in its straight condition and in contact with the first pin when the adjacent link plate pair is in it maximum flexed condition.

6. The silent chain according to claim 1, wherein the counter surface has an inner contact portion and a gap forming portion; the gap forming portion has an outer contact portion located outward from the inner contact portion in the direction proceeding from the inner side of the pitch line toward the outer side of the pitch line; the inner contact portion is in contact with the first pin both when the adjacent link pair is in its straight condition and when the adjacent link plate pair is in its maximum flexed condition; and the outer contact portion is spaced from the first pin when adjacent link plate pair is in its straight condition and in contact with the first pin when the adjacent link plate pair is in its maximum flexed condition.

* * * * *